United States Patent [19]

Stoor

[11] Patent Number: 5,709,475
[45] Date of Patent: Jan. 20, 1998

[54] POWERBOAT OUTDRIVE VENT PLUG MOUNTED TEMPERATURE DETECTION DEVICE

[75] Inventor: Michael G. Stoor, Hayden Lake, Id.

[73] Assignee: Larry E. Smith, Spirit Lake, Id.

[21] Appl. No.: 501,247

[22] Filed: Jul. 11, 1995

[51] Int. Cl.$^6$ .............................. G01K 1/14; G01K 7/22; G01K 13/00
[52] U.S. Cl. .................... 374/141; 374/208; 374/185; 440/1
[58] Field of Search ........................ 374/141, 208, 374/183, 185, 144; 440/1; 123/198 D

[56] References Cited

U.S. PATENT DOCUMENTS

| 4,637,737 | 1/1987 | Ricchio | 374/150 |
| 4,817,450 | 4/1989 | Jachim | 374/208 |
| 4,904,091 | 2/1990 | Ward | 374/208 |
| 5,318,363 | 6/1994 | Mauric | 374/208 |
| 5,366,290 | 11/1994 | Mayer et al. | 374/208 |
| 5,447,374 | 9/1995 | Fraser et al. | 374/208 |

FOREIGN PATENT DOCUMENTS

| 2045433 | 10/1980 | United Kingdom | 374/208 |
| 2115550 | 9/1983 | United Kingdom | 374/208 |

Primary Examiner—Diego F. F. Gutierrez
Attorney, Agent, or Firm—Wells, St. John, Roberts, Gregory & Matkin PS

[57] ABSTRACT

A powerboat gear case plug hole mounted temperature detection device is described including a sensor base with an integrated vent plug that is threadably receivable within an existing plug hole in a marine powerboat gear case. The threaded plug section mounts within the gear case plug hole to seal the vent plug hole and locate the sensor base in a thermally exposed position within the gear case. A temperature sensor for generating a signal responsive to temperature variations is mounted within the sensor base for thermal communication with the sensor base. The mount for the sensor facilitates rotation of the sensor base relative to the temperature sensor. A sensor wire is mounted to the temperature sensor and extends outwardly therefrom for transmitting signals from the temperature sensor. An elongated flexible sheath is mounted to the sensor base, loosely receiving and encasing the sensor wire. The wire is electrically connectable to an indicator for translating the temperature signals into a human sensory recognizable form.

13 Claims, 5 Drawing Sheets

FIG. 1

POWERBOAT OUTDRIVE VENT PLUG MOUNTED TEMPERATURE DETECTION DEVICE

TECHNICAL FIELD

The present invention relates to detection of temperature fluctuations within powerboat outdrive gear cases.

BACKGROUND OF THE INVENTION

One of the costliest repairs to be made on a powerboat involves the outdrive unit. This is true both for outdrive units on inboard outboard drive systems, or in outboard drives.

Damage to outdrive units can be caused by a number of problems that may not be easily detected by the boat operator.

A nick or bend in a propeller blade may go undetected, yet cause enough imbalance and vibration in the drive linkage to cause overheating and damage to bearings.

A fishing line wound about a propeller shaft can damage or break a seal along the drive line. The broken seal will allow lubricant to slowly seep from the gear case, again causing overheating and eventual bearing failure.

A sudden jolt typically caused by the outdrive unit striking an object such as a log or rock, can cause miss-alignment in the driveline, especially in inboard-outboard units. Such miss-alignment will also cause bearing wear and overheating.

Simple lack of maintenance, such as failure to periodically change gear case lubricant, can result in bearing wear, seal wear, lubricant leakage, all with attendant overheating in the gear case. Lubricant will also eventually break down and allow friction within the gear case to increase. As this happens, temperature inside the gear case increases.

As may be understood from the above, many outdrive problems include symptomatic overheating of the gear case. Yet, to the inventors knowledge, there has never been a device provided for indicating gear case temperature. A need has certainly existed, since such an indicator device could readily forewarn the boat user at an early stage, whether damage to the outdrive is about to occur, or whether maintenance is overdue.

Temperature sensors and indicator devices have long been in use in the automotive and other industries, to allow monitoring for potential problems. The reason similar temperature sensing and indicator units have not been made available for marine outdrive use stems at least partially from failure to recognize the problem that lubricant overheating in marine outdrives is an early detectable symptom of impending potentially serious internal problems. Continuous overheating within an outdrive unit, if undetected, will result in destruction of the entire outdrive unit. A relatively simple maintenance or repair problem can easily turn into a major, very expensive repair.

Once the problem becomes recognized, several other problems become evident. It has been found that a standard automotive form of heat sensor cannot easily be attached to a powerboat outdrive to detect gear case temperatures.

Outdrive units are used not only to transmit driving power to the water, but also to steer and to trim the craft during operation. Outdrives are therefor articulated about a number of axes during use. Such use occurs while at least part of the outdrive is partially submerged, at various speeds, and in fresh or salt water of various temperatures. Such high motility and extreme operating conditions will not permit attachment of standard, automotive forms of heat detector units, nor are such units designed for marine use.

Wires leading from standard contacts on automotive or other standard forms of temperature sensing units are not easily sealed against water induced electrical short circuits. Unguarded wires will also quickly become twisted and will break. Further, expensive boring and tapping processes need to be performed to mount an automotive temperature sensor to a marine outdrive gear case.

The present invention represents recognition of the above problems by providing a gear case temperature indicating device that is readily mountable to outdrive gear cases, and that will effectively indicate gear case temperatures to the powerboat operator.

By provision of the present invention, early detection of elevated gear case or lubricant temperatures is now readily discernable. The boat owner or operator is now able to spot early symptoms in time to perform maintenance or minor repairs, well before more serious damage occurs.

Further, the present invention is a complete, novel, and unobvious solution to the above problems by providing a temperature detection device for outdrives that is readily adaptable to any form of outdrive without requiring machining of the gear case for sensor mounting.

The present invention also provides a solution to the wire twisting and breakage problem presented by such highly mobile outdrive units by providing a sensor mounting arrangement that will avoid stress by twisting and breakage of wires leading from the outdrive mounted sensor to the relatively stationary boat. The mounting arrangement also functions to seal the sensor and wires, both from water and from the internal portions of the gear case.

The above and further objects and advantages of the present invention will become apparent from the following specification, drawings, and claims.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figures 2, 3:
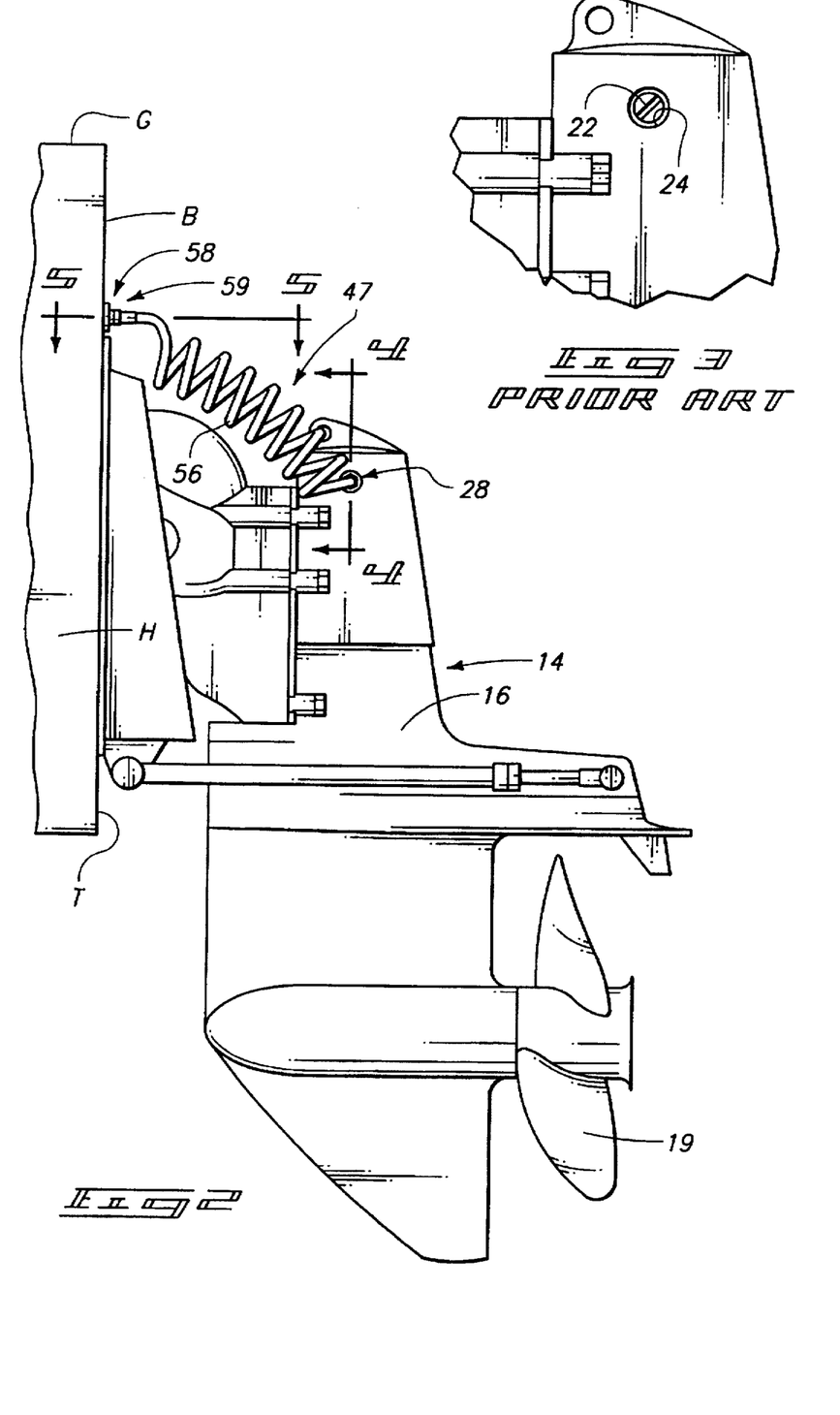
FIG. 2 is a fragmented diagrammatic view showing connection between portions of one preferred form of the present invention to a powerboat and an inboard-outboard outdrive.
FIG. 3 is a fragmented view illustrating a prior art vent plug on an inboard-outboard outdrive.

The present invention is exemplified in this application in two preferred forms. A first preferred form is shown in FIG. 2, adapted for mounting to an inboard-outboard outdrive unit 14. A second preferred form is shown in FIG. 6 adapted for an outboard outdrive unit 15.

In each example, the illustrated outdrive unit 14, 15 is shown mounted to a powerboat B having a transom T, a hull H, and a gunnel G leading forwardly from the transom T. Portions of the powerboat B are generically illustrated to indicate versatility in usage on powerboats in general. It is intended that the present invention be useful on many different shapes and forms of powerboats B. In fact, it is also intended that the present device be adaptable to many different brands and models of existing and future inboard-outboard outdrives 14 and outboard outdrives 15.

Thus, for purposes of this application, the term "outdrive" is defined herein in a broad sense to include: (a) various forms of stern drive units of inboard-outboard marine drive assemblies (outdrive 14, FIG. 2); and (b) the drive assemblies provided on outboard motors (outdrive 15, FIG. 6).

Figures 6, 7:
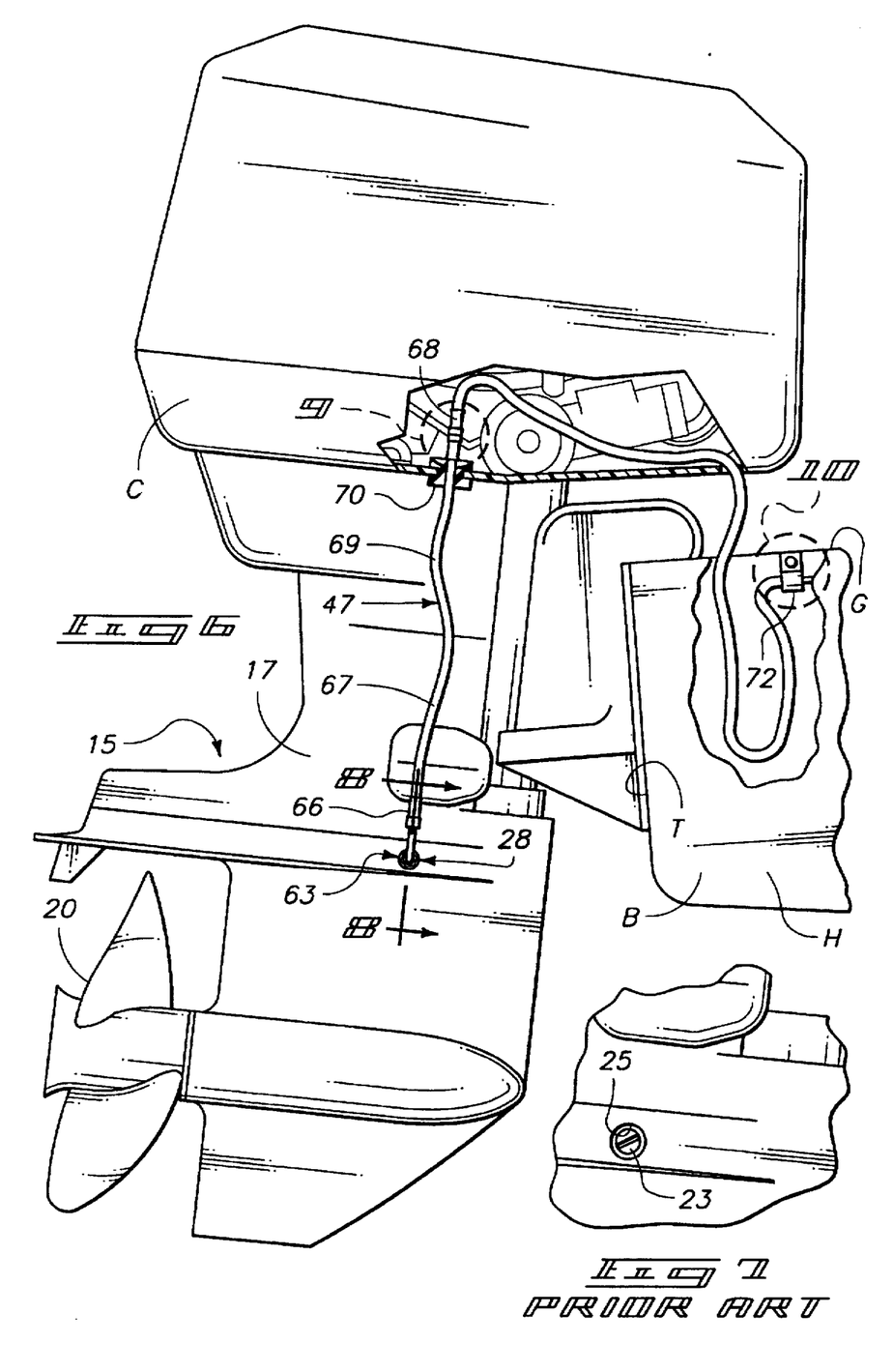
FIG. 6 is a fragmented diagrammatic view showing connection between portions of another preferred form of the present invention to a powerboat and an outboard outdrive.
FIG. 7 is a fragmented view illustrating a prior art vent plug on an outboard outdrive.

In both forms, the respective outdrives 14, 15 generally include gear cases 16 and 17, which are provided to seal and enclose conventional driveshafts, bearings, gearing, and other components (not shown) essential to transmission of driving forces to propulsion devices such as the propellers shown at 19 and 20 in FIGS. 2 and 6 respectively.

In such outdrives, gear case vent plugs 22 and 23 are typically provided. The vent plugs 22, 23 are typically a simple threaded screw or bolt, engaged in a similarly threaded vent plug hole 24, 25 that opens into the gear case interior. Such plugs 24, 25 normally seal the gear cases 16, 17, but are removable to vent the gear case interiors during changing of lubrication.

Removal of the vent plugs 22, 23 opens the otherwise sealed interior of the gear cases to the atmosphere and thereby allows existing lubricant within the gear cases to be drained through drain openings that are typically provided in the gear cases in the vicinity of the propellers. The drain openings are also sealed by a removable plug (not shown in the drawings). Once the old lubricant is drained, fresh lubricant may be injected through the drain openings.

Given the above general features of outdrive units, the following further detailed description of the present invention may now be readily understood.

In general, both preferred forms of the present invention include a sensor base 28. In a preferred form, the sensor base is formed of a heat transmissive body. The sensor base 28 is advantageously produced by standard forming processes from a corrosion resistant, heat conductive material such as brass, stainless steel or another appropriate rigid, non-corrosive, formable material.

The sensor base 28 includes a vent plug 29 that, in the preferred form, is integral with the base 28. The plug 29 includes connector means 30 for releasably securing the vent plug to the outdrive 14 or 15. In the preferred forms, the connector means is comprised of threads 31 adapted to be threadably engaged within the outdrive vent plug holes 24, 25, replacing the standard, existing vent plug 22 or 23.

In either form, the threaded vent plug advantageously includes a shoulder 32 for abutment with the outdrive. A washer (not shown) might also be provided between the shoulders 32 and outdrives to provide a leak free seal.

Each of the sensor bases 28 includes a heat conductive member such as a sensor probe 34, on the associated vent plug 29. In either form, the sensor probe 34 is preferably integrated with the sensor base and formed of the same heat conductive material.

The present device may be produced with various sensor probe lengths, as determined by the proximity of the drive train components (not shown) within the gear case. The sensor probes are preferably exposed to the interior of the associated gear case or at least are put into contact with some surface of the gear case that will vary in temperature directly in response to temperature variations within the associated gear case.

Figure 4:
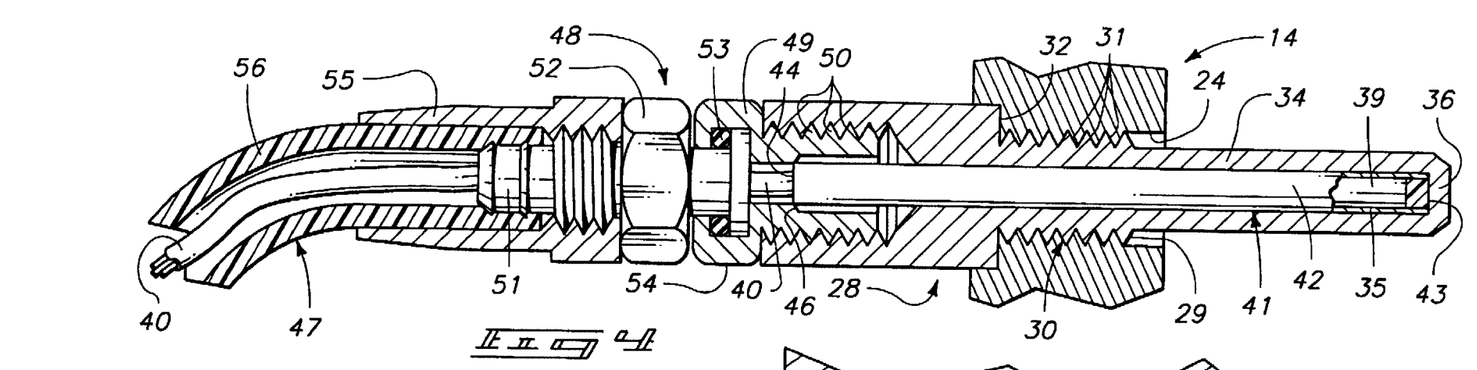
FIG. 4 is an enlarged fragmented sectional view taken substantially along line 4—4 in FIG. 2.
Figures 8, 9, 10:
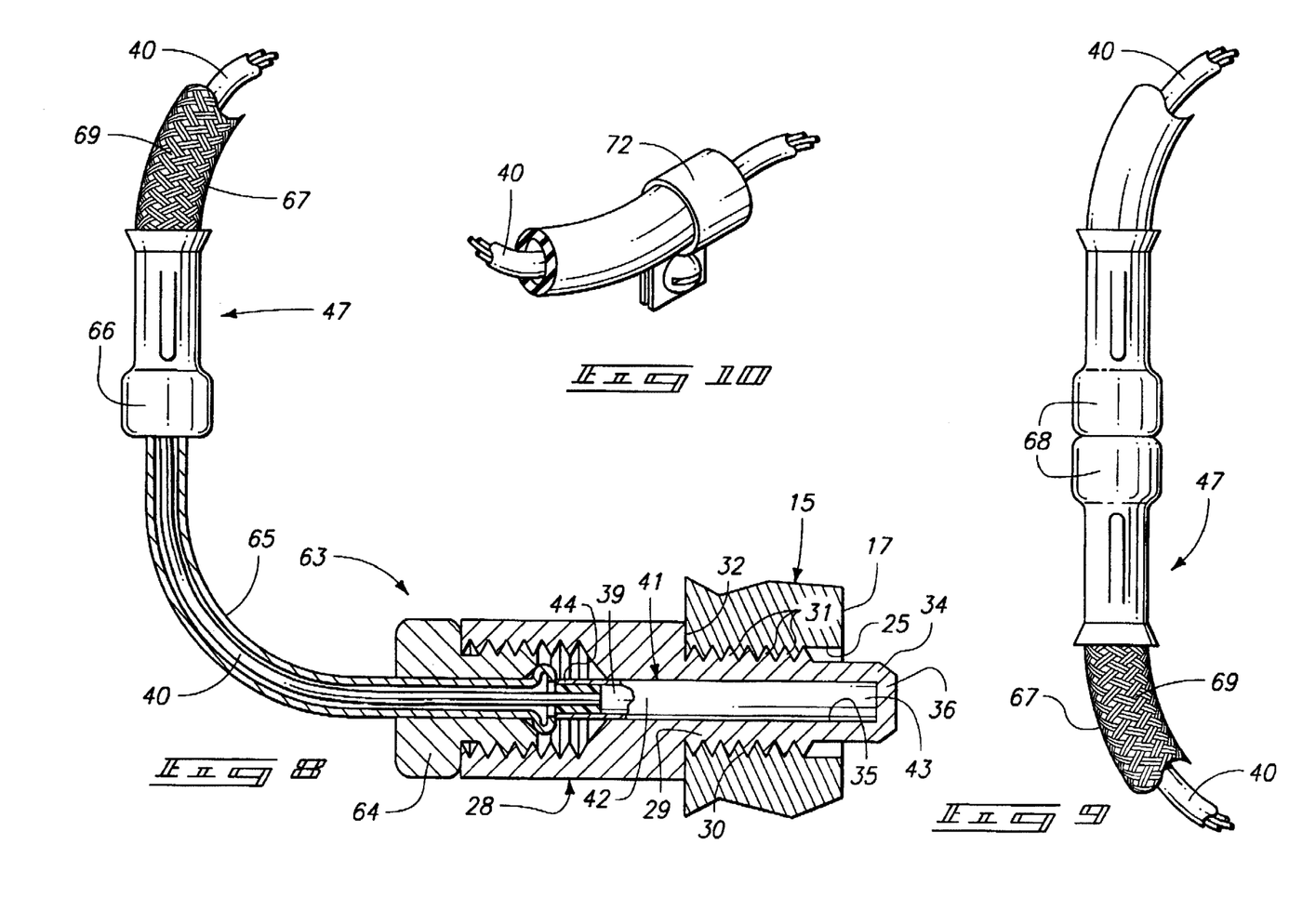
FIG. 8 is an enlarged fragmented sectional view taken substantially along line 8—8 in FIG. 6.
FIG. 9 is an enlarged detail view of the area identified by the numeral 9 in FIG. 6.
FIG. 10 is an enlarged perspective detail view of the area identified by the numeral 10 in FIG. 6.

To illustrate such sensor probe length variation, FIG. 4 illustrates the sensor probe 34 as having a length sufficient to project well into the associated gear case 16. In FIG. 8, the sensor probe 34 is shown in a much shorter version, near to, if not flush with, the interior wall of the associated gear case 17. It may be understood from this illustrative example that other probe lengths may be used.

The sensor probes 34 terminate at closed ends 36 that effectively seal interior portions of the sensor bodies from the gear case interiors. The contents of the sensor probes and sensor bases are thus sealed from direct exposure to the gear case contents, but are exposed to temperature variations within the gear cases through the thermally conductive probe materials.

An internal bore 35 is provided within each of the sensor bases, extending through the bases and along central axes to the closed ends 36 of the sensor probes 34. The bores 35 terminate inwardly of the closed ends of the sensor probes as shown in FIGS. 4 and 8. The bores 35 are thus sealed from the gear case interiors.

A temperature sensor 39 is provided within the internal bore 35 in each form of the sensor base 28. The sensor 39 generates a signal that is directly responsive to temperature variations within the associated gear case. In a preferred form, the sensor 39 is a thermistor, though other forms of resistive temperature sensors or thermocouples might also be used. An effective thermistor sensor is produced by TELTEK NW INC. of Spokane Wash. 99215.

In general, the thermistor responds to thermal change by varying its resistance to passage of electric current. Thus the generated "signal" from the thermistor sensor is detectable by measuring the electrical resistivity through the thermistor.

Means 41 is provided for mounting the temperature sensor within the sensor base 28 or vent plug 29 for thermal communication with the sensor base. Such means 41, in one preferred form, facilitates rotation of the sensor base 28 relative to the temperature sensor 39 about an axis.

In the preferred forms illustrated, each means 41 includes a heat conductive tubular member 42 encasing the temperature sensor. The tubular member 42 is formed of a heat conductive material such as brass or other heat transmissive material. The tubular member 42 is shaped to be slidably and rotatably received within the bore 35.

The tubular member 42 thus serves to protect the sensitive temperature sensor and permit relative movement between the temperature sensor and sensor base, as might be expected when the sensor base is removed from the gear case to permit gear case lubricant servicing as described above. The tube also transmits heat to the temperature sensor 39, which may be secured within the tube by a hard setting adhesive such as epoxy.

An end 43 of tube 42 advantageously engages or butts up against the closed end 36 of the sensor probe 34. This arrangement is preferred to maximize heat transfer to the enclosed temperature sensor 39. An opposite end 44 may loosely abut an internal shoulder 46 of the sensor body. Thus the tube 42 and temperature sensor 39 are confined longitudinally within the sensor base, but are relatively free for rotational movement therein.

A sensor wire 40 is mounted to the temperature sensor and extends outwardly therefrom for transmitting the signal generated by the temperature sensor. The wire 40, as shown, is preferably a shielded wire with a multiple wire core. Wires in the core are connected in series with the temperature sensor 39 to facilitate resistance measurements that can be translated by known circuitry within an indicator means 75 (described below) into human sensory recognizable form.

It is advantageous that the wire lengths extending from the sensor bases 28 be protected against twisting and forces that would otherwise tend to break or damage them during normal use of the associated powerboats. To this end, two forms of protective apparatus are provided and are generally referred to as an elongated flexible sheath 47.

As a general description, each sheath 47 is provided with one end mounted to the associated sensor base. The sheaths 47 then extend to a remaining ends which are adapted to be attached to the associated powerboat. The sheaths 47 loosely receive those parts of the wires 40 extending between the sensor bases 28 and powerboat.

Figure 5:
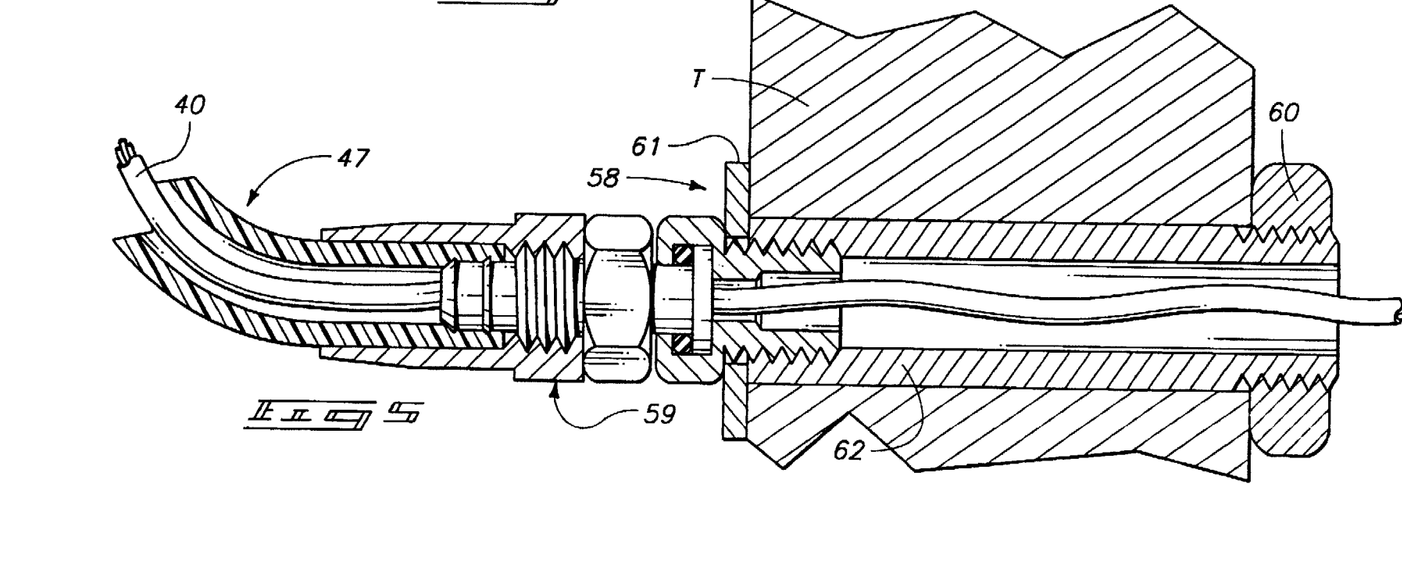
FIG. 5 is an enlarged fragmented sectional view taken substantially along line 5—5 in FIG. 2.

A first form of sheath 47 is illustrated generally in FIGS. 2, 4, and 5 for use with inboard-outboard outdrives 14. The second preferred sheath 47 is illustrated generally in FIGS. 6 and 8–10 for use with outboard outdrives 15. Both, however, accomplish the same function of protecting the sensor wire 40. However, due to differences in configuration, each will be described separately.

Referring to FIGS. 2 and 4, the sheath of a first form is shown with a swivel fitting 48 at its inner end. The swivel fitting 48 includes a first swivel member 49 having threads 50 in mating engagement with threads formed within the adjacent sensor base 28.

Fitting 48 also includes a second swivel member 52 rotatably mounted to the first fitting member 49 by a rotational connection 53. Both members are advantageously formed of noncorrosive material such as brass and are hollow to loosely receive the sensor wire 40.

The rotational connection 53 includes a conventional seal member such as a rubber "O" ring positioned between opposing flanges, one on each fitting member. The flanges and "O" ring allow one of the fitting members 49 or 52 to rotate freely relative to the other.

In another form (not shown), the first swivel fitting 48 could be provided as an integral part of the sensor base 28. This could be accomplished by forming the sensor base 28 with an integral first swivel member. This would eliminate the threads 50, as the sensor base and first swivel member would be formed in one solid piece.

However, in the presently preferred form, the swivel fitting is threadably joined, possibly permanently using a conventional thread locking adhesive, to the sensor base. Thus the tool engaging surface 54 provided on the first swivel member 49 may be engaged by a tool such as a wrench and turned in order to also turn the sensor base 28. As this happens, the second swivel member 52, sensor 39 and sensor wire 40 will remain rotationally stationary, enabling the sensor base to be mounted to or removed from the gear case vent plug hole without twisting the sheath or sensor wire.

A threaded hose barb 51 is provided at an outward end of the second swivel member. The barb part receives a first end of an elongated plastic tube 56. A connector flange 55 is threadably received on the threaded part of the barb over the first tube end to secure and seal the plastic tube end as shown in FIG. 4. The tube is thus secured to the second swivel member, in sealed relation but rotationally isolated from the first swivel member.

The elongated flexible plastic tube 56 is preferably coiled in helical form (FIG. 3) and loosely receives the sensor wire 40, shielding it from exposure to damage. It has been found that 6–10 coils of polyethylene tubing with a ¼ inch bore and with each coil of approximately of 2¼ inch diameter is preferred. The tube 56 arranged in this manner is of sufficient length to permit unhampered movement of the adjacent outdrive relative to the powerboat. The helical form will flex with any movement of the outdrive and will return in a spring-like fashion to its original configuration as the outdrive is returned to its beginning position.

A mount 58 (FIGS. 2 and 5) is provided adjacent the second end of the flexible plastic tubing to secure the sheath to the powerboat and guide the sensor wire 40 through the transom T.

The second end of the plastic tubing is secured to a second swivel fitting 59 that is substantially identical to the swivel fitting 48 described above. The swivel fitting 59 is threadably secured to the mount 58 allowing the attached flexible plastic tubing and the enclosed sensor wire 40 to swing about without twisting as the outdrive is moved.

The mount includes a transom clamp means, provided as a length of rigid tube 62, fitted through a hole bored through the powerboat transom T. The rigid tube 62 is internally threaded at one end to receive the second swivel fitting 59 and externally threaded at its remaining end to receive a clamp nut 60. The nut 60 cooperates with a washer 61, placed between the fitting 59 and powerboat transom, to securely clamp the mount in place and provide a firm attachment for the flexible plastic tube 56.

The second form of sheath 47, used for outboard motors, is best described with reference to FIGS. 6 and 8–10. It includes a swivel fitting 63 connected to the associated sensor base 28 by a threaded nut 64, and a flanged guide tube 65. The nut 64 and tube 65 are preferably formed of noncorrosive material such as brass or stainless steel.

The flanged guide tube 65 leads to a swaged fitting 66 which secures the tube 65 to a length of flexible tubing 67 that loosely receives the sensor wire 40. Reinforced rubber hydraulic hose having a ³⁄₁₆ inch bore has been found to have appropriate strength and noncorrosive properties for protecting the sensor wire. A section of the tubing 67 is advantageously provided with a woven hose guard 69 (FIG. 8), preferably formed of stainless steel wire strands.

The length of flexible tubing 67 covered by the hose guard 69 is preferred to be slightly greater than the distance between the gear case vent plug hole 26 and the outboard motor cowling C, as shown partially broken away in FIG. 6. The cowling is bored to receive a split rubber grommet 70 or other mounting device that will effectively secure the top end of the shielded section within the engine cowling C.

A second swaged fitting 68 is provided to secure the top end of the hose guard to the remaining length of the tubing 67. The fitting 68 is preferably positioned within the cowling when the device is mounted to the outboard engine. The remaining length can be threaded forwardly through an existing opening in the cowling C that is normally provided for control cables.

The transom clamp means in the embodiment shown in FIG. 6 is provided as clip 72, securing the remote end of the tubing 67 to the transom T of the powerboat B. The clip 72 (FIG. 10) is positioned close to the engine so enough tube length remains slack between the clip and engine to allow the outboard to move freely relative to the transom T.

In both versions described above, the sensor wire 40 leads from the sheath 47 to the indicator means 75 as briefly discussed above. Indicator means 75 is connected to the wire for translating signal generated through the sensors 39 into a human sensory recognizable form. A plug 74 assembly (FIG. 1) is provided in the wire 40 to enable installation and removal of the sensor.

A preferred form of indicator 75 is available on the marketplace and is identified as the "INFORMER II MR"™ brand temperature indicator produced by TELTEK NW INC of Spokane Wash. 99215. This commercial indicator includes an internal power source (but may be easily adapted for connection with the powerboat electrical supply) and internal features that enable display and recordation of high and low temperatures. Other equivalent indicators (not shown) that are available from the same source or other suppliers may be provided with additional or enhanced features such as warning lights, audible tone warnings and pre-setting capabilities that permit selection of temperature ranges at which the warnings are activated.

Figure 1:
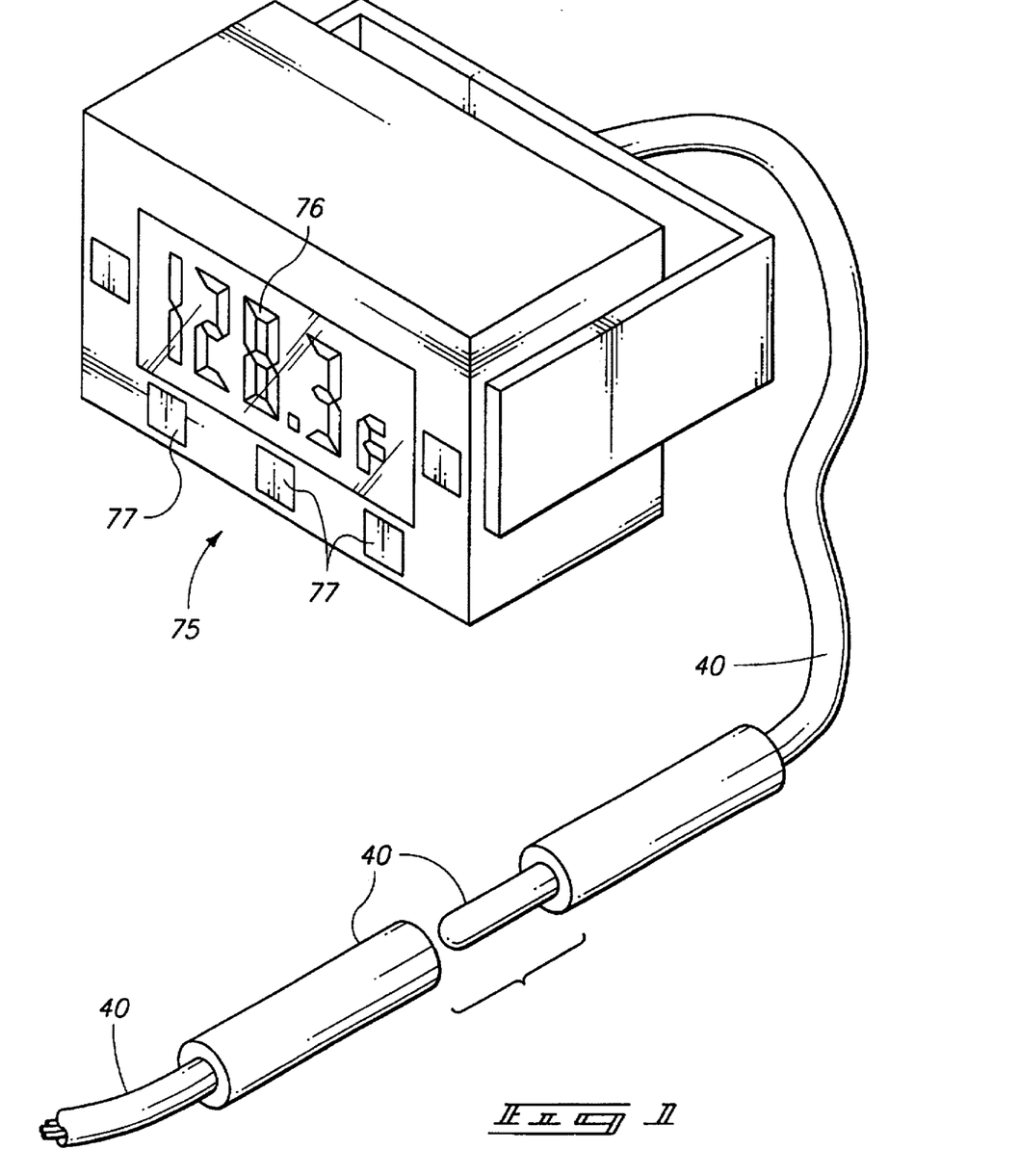
FIG. 1 is a diagrammatic fragmented view showing an exemplary indicator for use with the present invention.

The presently preferred temperature indicator 75 includes a display 76 that indicates temperature digitally in degrees fahrenheit. Of course other forms of display may be provided in alternate forms as described above. Controls 77 are provided with the indicator that enable recordation and retention of high and low temperatures. These features allow the user to recall previous high operating temperatures for comparison purposes to determine if the current temperature is too high.

The present device is installed simply by removing the crank case vent plug on the powerboat outdrive, and substituting the present sensor base 28. This simple step effectively places the temperature sensor in thermal contact with the gear case interior. All that remains is mounting the sheath to the transom, and attaching the indicator 75 to the dashboard area of the power boat adjacent the operator's station. This is done as indicated above, by drilling the transom (in the inboard-outboard unit) or by drilling the cowling in the outboard unit to receive the mount. The mount and wire are then installed, and the wire is connected to the indicator using the plug 74. If desired, the indicator is then mounted at the operator's station or wherever desired on the powerboat. Appropriate connections are next made (if needed) to connect the indicator to the electrical supply of the powerboat. The device is now ready for operation.

It is preferred that the use begin soon after the outdrive had been serviced, so a normal operating temperature can be established. A normal high temperature within the gear case is recorded by initially running the powerboat in normal and high speed conditions. The user monitors the temperature indicated during this set-up time, to determine a range of normal operating conditions. If as preferred the indicator includes provisions for recording a normal high temperature, the user may set that temperature in the indicator's memory. Otherwise, (if another indicator is used), the overall high temperature should be marked down and stored for future reference. Thereafter, the user need only compare the recorded high temperature with the temperature currently being indicated to determine whether the gear case is overheating. An increase of approximately 10 degrees or more from the recorded high normal operating temperature will indicate an impending need to service or maintain the outdrive. Serious damage to the gear case may thus be avoided.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A powerboat outdrive gear case including a vent plug hole and a temperature detection device mountable within the vent plug hole, comprising:

a sensor base including a vent plug;

the vent plug including a vent plug connector releasably securing the vent plug within the outdrive gear case vent plug hole and sealing the vent plug hole with the sensor base thermally exposed within the outdrive gear case;

a temperature sensor for generating signals responsive to temperature variations within the outdrive gear case;

means mounting the temperature sensor within the vent plug for thermal communication with the sensor base, and facilitating rotation of the sensor base relative to the temperature sensor about an axis;

a sensor wire mounted to the temperature sensor and extending outwardly therefrom for transmitting said signals generated by the temperature sensor;

an elongated flexible sheath having one end mounted to the sensor base, and a remaining end, said sheath loosely receiving and encasing the sensor wire; and indicator means connected to the wire for translating said signals into a human sensory recognizable form.

2. A powerboat outdrive gear case including a vent plug hole and a temperature detection device as claimed by claim 1, wherein the sensor base is comprised of:

a heat transmissive body; and a sensor probe integral with the heat transmissive body.

3. A powerboat outdrive gear case including a vent plug hole and a temperature detection device as claimed by claim 1, wherein the sensor base is comprised of:

a solid heat transmissive body;

a sensor probe on the body projecting therefrom; and a bore formed within the body extending into the sensor probe receiving the temperature sensor for relative rotation therein.

4. A powerboat outdrive gear case including a vent plug hole and a temperature detection device as claimed by claim 1, wherein the sensor base is comprised of:

a heat conductive member on the vent plug;

a bore formed within the vent plug and extending into the heat conductive member;

a tubular member encasing the temperature sensor and formed of heat transmissive material; and wherein the tubular member is mounted within the bore for relative rotation therein.

5. A powerboat outdrive gear case including a vent plug hole and a temperature detection device as claimed by claim 1, further comprising a swivel fitting mounting the sheath to the sensor base, permitting relative rotational motion of the sensor base and sheath.

6. A powerboat outdrive gear case including a vent plug hole and a temperature detection device as claimed by claim 1, further comprising: a swivel fitting mounting the sheath to the sensor base, permitting relative rotational motion of the sensor base and sheath; and wherein the sheath is formed of flexible plastic tubing formed in an expandable helical configuration.

7. A powerboat outdrive gear case including a vent plug hole and a temperature detection device as claimed by claim 1, wherein the sensor is a thermistor.

8. A powerboat outdrive gear case including a vent plug hole and a temperature detection device as claimed by claim 1, wherein the sensor is a thermistor mounted within a heat conductive tubular member rotatably received within the sensor base.

9. In combination, a powerboat outdrive gear case and a temperature detection device, comprising:

a gear case drain plug opening formed in the gear case;

a temperature sensor configured to generate temperature responsive signals;

a mount releasably securing the sensor within the drain plug opening of the outdrive gear case and in thermal communication therewith such that temperature responsive signals produced by the temperature sensor relate to temperature within the outdrive gear case;

a signal relay operably connected to the temperature sensor for transmitting the temperature responsive signals to a location remote from the outdrive gear case; and an indicator at the remote location configured to translate said temperature responsive signals produced by the temperature sensor into a human sensory recognizable form.

10. A powerboat outdrive gear case vent plug hole mountable temperature detection device, comprising:

a sensor base;

connector configured to releasably secure the sensor base to a powerboat outdrive gear case;

a temperature sensor capable of producing signals responsive to temperature variations;

a mount positioning the sensor within the sensor base for thermal communication with an outdrive gear case;

a sensor wire mounted to the temperature sensor and extending outwardly therefrom for transmitting said signals from the temperature sensor;

an elongated flexible sheath loosely receiving and encasing a length of the sensor wire, and extending between first and second ends;

a swivel fitting on the first end of the sheath, loosely receiving the sensor wire and rotatably mounting the sheath to the sensor base;

a mount adjacent the second end of the sheath configured to secure the second end of the sheath to a powerboat; and indicator means connected to the sensor wire for translating said signals from the temperature sensor into a human sensory recognizable form.

11. A powerboat outdrive gear case vent plug hole mountable temperature detection device as claimed by claim 10 wherein the sheath is comprised of a helical coil of flexible tubing.

12. A powerboat outdrive gear case vent plug hole mountable temperature detection device as claimed by claim 10 wherein the sheath is comprised of a helical coil of flexible tubing; and wherein the amount at the second end of the sheath is comprised of a transom clamp configured to secure the second end of the sheath to a powerboat transom.

13. A powerboat outdrive gear case vent plug hole mountable temperature detection device as claimed by claim 10 wherein the sheath is comprised of a length of flexible tubing including a woven stainless steel hose guard; and wherein the mount adjacent the second end of the sheath is comprised of a transom clamp configured to secure the second end of the sheath to a powerboat transom.

* * * * *